United States Patent
Marion (10) Patent No.: US 11,321,426 B2
(45) Date of Patent: May 3, 2022

(54) METHOD AND SYSTEM FOR PROVIDING LIMITED DISTRIBUTION OF A DIGITAL MEDIA FILE

(71) Applicant: SCENAREX INC., Brossard (CA)

(72) Inventor: Simon-Pierre Marion, Brossard (CA)

(73) Assignee: SCENAREX INC., Brossard (CA)

( * ) Notice: Subject to any disclaimer, the term of this patent is extended or adjusted under 35 U.S.C. 154(b) by 0 days.

(21) Appl. No.: 16/486,445

(22) PCT Filed: Feb. 22, 2018

(86) PCT No.: PCT/IB2018/051119
§ 371 (c)(1),
(2) Date: Aug. 15, 2019

(87) PCT Pub. No.: WO2018/154489
PCT Pub. Date: Aug. 30, 2018

(65) Prior Publication Data
US 2020/0380090 A1    Dec. 3, 2020

(30) Foreign Application Priority Data
Feb. 23, 2017    (CA) .................................. CA 2958668

(51) Int. Cl.
*G06F 21/10* (2013.01)
*G06F 21/60* (2013.01)
*H04L 9/32* (2006.01)

(52) U.S. Cl.
CPC .......... *G06F 21/10* (2013.01); *G06F 21/602* (2013.01); *H04L 9/3213* (2013.01);
(Continued)

(58) Field of Classification Search
CPC .................. G06F 21/10; G06F 21/602; G06F 2221/0711; G06F 21/6209;
(Continued)

(56) References Cited

U.S. PATENT DOCUMENTS

2008/0065911 A1 * 3/2008 Elazar .................... G06Q 30/06
713/194
2015/0127940 A1 * 5/2015 Polehn ................ H04L 63/0435
713/168
(Continued)

OTHER PUBLICATIONS

International Search Report and Written Opinion with regard to PCT/IB2018/051119 dated May 28, 2018.
(Continued)

*Primary Examiner* — Jeffrey D. Popham
(74) *Attorney, Agent, or Firm* — BCF LLP (57) ABSTRACT

A computer-implemented method of providing limited distribution of a digital media file, the method being executable at a server connected to a network, the server comprising memory. The method includes receiving the digital media file to be distributed; encrypting the digital media file to create an encrypted digital media file; creating a plurality of copies of the encrypted digital media file; creating a plurality of rights tokens, a quantity of the rights tokens being equal to a quantity of copies of the encrypted digital media file, each rights token containing: a key for decrypting a corresponding one of the plurality of copies of the encrypted digital media file, and identifying information related to access rights for the digital media file; and recording the rights tokens to a rights blockchain representative of actions related to distribution of the plurality of copies of the encrypted the digital media file.

13 Claims, 5 Drawing Sheets

(52) U.S. Cl.
CPC .... *G06F 2221/0711* (2013.01); *H04L 9/3236* (2013.01); *H04L 2209/38* (2013.01); *H04L 2209/603* (2013.01)

(58) Field of Classification Search
CPC ..... G06F 2221/2107; G06F 2221/2137; G06F 2221/2141; G06F 21/64; H04L 9/3213; H04L 9/3236; H04L 2209/38; H04L 2209/603; H04L 63/0428; H04L 9/3239
See application file for complete search history.

(56) References Cited

U.S. PATENT DOCUMENTS

| | | |
|---|---|---|
| 2017/0048217 A1 | 2/2017 | Biggs et al. |
| 2017/0116693 A1 | 4/2017 | Rae et al. |
| 2017/0220815 A1* | 8/2017 | Ansari ................. G06Q 20/389 |

OTHER PUBLICATIONS

Extended European Search Report with regard to the EP Patent Application No. 18758341.4 completed Dec. 2, 2020.

* cited by examiner

METHOD AND SYSTEM FOR PROVIDING LIMITED DISTRIBUTION OF A DIGITAL MEDIA FILE

CROSS-REFERENCE

The present application claims priority to Canadian Patent Application No. 2958668, entitled "Methods and Apparatus for Integrating Digital Rights Management into an Existing Blockchain," filed Feb. 23, 2017, the entirety of which is incorporated herein by reference.

FIELD OF THE TECHNOLOGY

The present technology relates to digital documents in general and, specifically, to a method of and a system for providing limited distribution of a digital media file.

BACKGROUND

Digital media, for example digital books ("eBooks"), have gained popularity over the last two decades and continues to be a growing market. A common problem of this industry is the unauthorized copying and distribution of the digital media.

To prevent unauthorized copying and distribution of digital media many organizations utilize digital right management (DRM). DRM formats are various access control technologies that are used to restrict the usage of digital media in different ways. For example, some DRM formats restrict access to copy functionalities, which restricts what can be done with the digital media.

Unfortunately, organizations have struggled with the usage of DRM because DRM formats are not generally universally accepted. When used in a vertical market, for example, DRM often limits the portability of the digital media to other platforms outside of the vertical market. Further, some opponents to these vertical market DRM contend there is no evidence that DRM helps prevent copyright infringement, and instead serves only to inconvenience legitimate customers.

Organizations attempting to build DRM formats that are transferable from one platform to another (therefore not linked to a specific vertical market) also encounter difficulties. Costs and technological difficulties of creating and maintaining such digital copyrights can be substantial.

There remains therefore a desire for DRM related technology that addresses some of the above inconveniences.

SUMMARY

It is thus an object of the present technology to ameliorate at least some of the inconveniences present in the prior art.

Developers of the present technology have developed embodiments thereof based on their realization of at least one technical problem associated with the prior art solutions for digital rights management.

In order to provide limited distributions of digital works and preventing illegal copying of such works, while keeping their portability through different platforms, the present technology integrates the digital right (the copyright) of a digital work, for example an eBook, into an existing distributed database called blockchain. Information about ownership or access rights, as well as a key for decrypting an encrypted copy, are encapsulated into a code to manage the digital rights which are then recorded to the blockchain. The blockchain provides a secure and accessible transaction record of ownership or rights, encapsulated separately from the digital document. As such, encrypted copies can be moved between devices or systems, but remain accessible to the rightful owner. This ensures that copyrights of the eBook are protected, while keeping the digital file portable and cost efficient.

The present technology provides systems and methods to support copyright management (creating, assigning, securing and modifying) of digital rights. For example, when a user buys an eBook, the digital media will activate the digital rights private and public keys, including in some cases a smart contract, in the blockchain and link the digital right to that user digital document representing the eBook. When a user opens their purchased eBook, the digital media validates through the blockchain its right of use by validating private and public keys. When the user wants to resell their digital right (the user wishes to sell their eBook to another user), a payment notification will be sent to the buyer email address and after processing the payment, the payment processor will send a notification to the blockchain in order to modify the private key and link it to the new owner of the digital right.

According to a first broad aspect of the present technology, there is provided a computer-implemented method of providing limited distribution of a digital media file, the method being executable at a server connected to a network, the server comprising memory. The method includes receiving, by the server from an originator, the digital media file to be distributed; encrypting, by the server, the digital media file to create an encrypted digital media file; creating, by the server, a plurality of copies of the encrypted digital media file; creating, by the server, a plurality of rights tokens, a quantity of the plurality of rights tokens being equal to a quantity of the plurality of copies of the encrypted digital media file, each one of the rights tokens containing at least: a key for decrypting a corresponding one of the plurality of copies of the encrypted digital media file, and identifying information related to access rights for the digital media file; and recording, by the server via the network, the plurality of rights tokens to a rights blockchain, the rights blockchain being representative of actions related to distribution of the plurality of copies of the encrypted the digital media file.

In some embodiments of the method, the method further includes receiving, by the server from the originator, information related to desired controls to be placed on the plurality of copies of the digital media file; creating a smart contract for managing distribution of the plurality of copies of the digital media file, the smart contract including at least the information related to the desired controls; and wherein the smart contract is encapsulated into each one of the rights tokens.

In some embodiments of the method, the smart contract indicates an end date for the access rights for the digital media file; and the method further includes receiving, from a user device, a request to access a given copy of the digital media file; determining that the request was sent after the end date recorded in the smart contract; and sending an indication to the user device that the given copy of the digital media file cannot be accessed.

In some embodiments of the method, the method further includes receiving, from the originator, information related to a desired number of copies of the digital media file to allow for distribution; and wherein the quantity of rights tokens created corresponds to the desired number of copies of the digital media file.

In some embodiments of the method, the method further includes receiving, by the server from the originator, a request to store at least one copy of the plurality of copies of the encrypted digital media file in the rights blockchain; determining, by the server, that a file size of the at least one copy exceeds a storage capacity of a block of the rights blockchain; subdividing, by the server, the digital media file into a plurality of subpackets of information; encrypting, by the server, each one of the plurality of subpackets of information; creating, by the server, an assembly key for reassembling the plurality of subpackets of information; and recording, by the server via the network, the plurality of subpackets of information to the rights blockchain, the plurality of subpackets of information being recording over a plurality of blocks of the rights blockchain; and wherein a corresponding one of the plurality of rights tokens further includes the assembly key for the at least one copy.

In some embodiments of the method, the method further includes recording the plurality of copies of the encrypted digital media file to the rights blockchain.

In some embodiments of the method, the method further includes storing the plurality of copies of the encrypted digital media file to the memory of the server.

In some embodiments of the method, the method further includes storing, via the network, the plurality of copies of the encrypted digital media file to a database external to the server, the database being operatively connected to the network.

In some embodiments of the method, the method further includes recording a link to at least one of the plurality of copies stored in the database to at least one block of the rights blockchain.

In some embodiments of the method, the method further includes receiving, from a user device, a request to access a given copy of the encrypted digital media file, the request including user identifying information related to a user; verifying access rights of the user, by the server via the network, by comparing the identifying information contained in a corresponding one of the plurality of rights tokens to the user identifying information; and when the identifying information of the corresponding one of the plurality of rights tokens matches the user identifying information, providing, to the user device, the key from the corresponding one of the plurality of rights tokens for decrypting the encrypted copy of the digital media file.

In some embodiments of the method, the digital media file is a digital literary document; and the originator is an owner of a copyright of the digital literary document.

In some embodiments of the method, the method further includes encoding at least one of the plurality of copies of the encrypted digital media file for sharing over a social networking platform.

According to another broad aspect of the present technology, there is provided a computer-implemented method of gaining access to a copy of a digital media file, the copy being one of a limited number of copies, the method being executable on a user device connected to a network. The method includes sending a request, by the user device to a server via the network, to gain access to the copy of the digital media file; receiving, from the server, an indication of an encrypted version of the copy of the digital media file, the indication including at least one of a website address for accessing the encrypted version of the copy via the network, a website address for downloading the encrypted version of the copy to the user device, and the encrypted version of the copy to be stored to the user device; receiving, from the server, a confirmation of access rights including information for exchanging a rights token associated with the copy, the rights token including at least a key for decrypting the encrypted version; causing, by an application of the user device, a rights blockchain to be updated to record the exchanging of the rights token; and retrieving, from the blockchain over the network, the key for decrypting the encrypted version.

According to another broad aspect of the present technology, there is provided a computer-implemented method of providing access to a copy of a digital media file, the copy being one of a limited number of copies, the method being executable on a server connected to a network, the server being connected to a user device via the network. The method includes receiving a request, by the server from the user device, to gain access to the copy of the digital media file; retrieving, by the server, an encrypted version of the copy of the digital media file from at least one of at least one block of a rights blockchain, and a database connected to the server via the network; determining, by the server, that a user of the user device has access rights for the copy of the digital media file, the determining including retrieving information from a rights token associated with the copy of the digital media file, the rights token including at least a key for decrypting the encrypted version; and causing the user device to display a decrypted copy of the digital media file.

According to another broad aspect of the present technology, there is provided a server including a network communication interface for two-way communication over a network; memory for storing instructions; and a processor operatively connected to the memory and the network communication interface. The processor is configured to execute the instructions to receive, from an originator, the digital media file to be distributed; encrypt the digital media file to create an encrypted digital media file; create a plurality of copies of the encrypted digital media file; create a plurality of rights tokens, a quantity of the plurality of rights tokens being equal to a quantity of the plurality of copies of the encrypted digital media file, each one of the rights tokens containing at least a key for decrypting a corresponding one of the plurality of copies of the encrypted digital media file, and identifying information related to access rights for the digital media file; and record, via the network, the plurality of rights tokens to a rights blockchain, the rights blockchain being representative of actions related to distribution of the plurality of copies of the encrypted the digital media file.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple client devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless specifically provided otherwise, a blockchain is a distributed database, meaning "a database in which storage devices are not all attached to a common processor. It may be stored in multiple computers, located in the same physical location; or may be dispersed over a network of interconnected computers" (source Wikipedia) or over any other devices, for example, over one or more devices of an internet of things.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
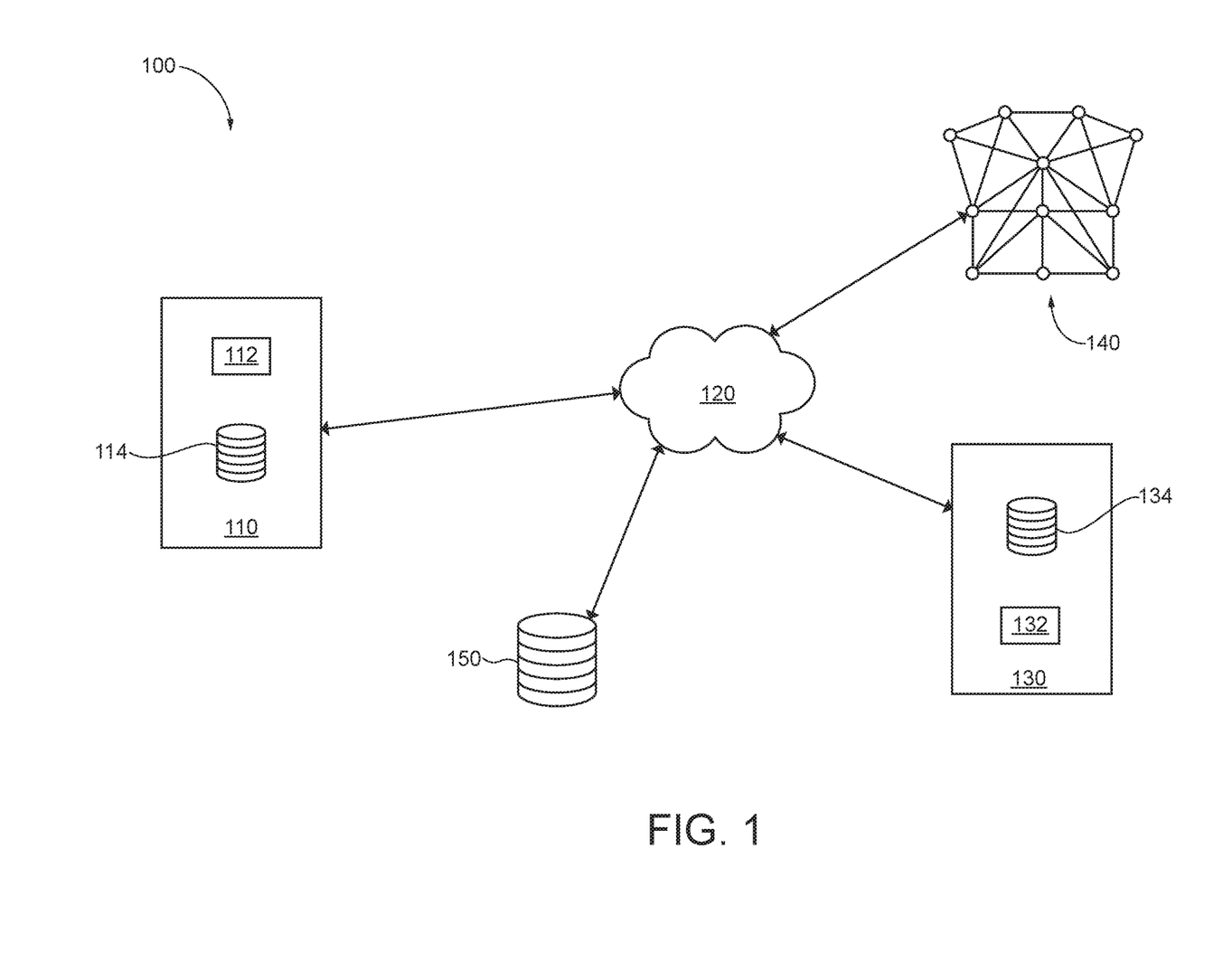
FIG. 1 is a schematic illustration of a system according to the present technology.

Referring to FIG. 1, there is illustrated a system 100 suitable for implementing non-limiting embodiments of the present technology. It is to be expressly understood that the system 100 is depicted as merely as an illustrative implementation of the present technology and the following is intended to be only a description of illustrative examples of the present technology. This description is not intended to define the scope or set forth the bounds of the present technology.

The system 100 includes an electronic device 110. The electronic device 110 is typically associated with a user (not depicted) and, as such, is also referred to as a "user device". It should be noted that the fact that the electronic device 110 is associated with the user does not need to suggest or imply any mode of operation—such as a need to log in, a need to be registered or the like.

In the methods presented herein below, the electronic or user device 110 is used to represent two distinct parties utilizing an electronic device such as the user device 110: both an end user referred to as an "originator" and an end user simply referred to as "user." While these are two different types of persons or companies utilizing the user device 110, there is no substantial difference between the device 110 used by the two parties.

The implementation of the electronic device 110 is not particularly limited, but as an example, the electronic device 110 may be implemented as a personal computer (desktops, laptops, netbooks, etc.), a wireless electronic device (a cell phone, a smartphone, a tablet and the like), as well as network equipment (a router, a switch, or a gateway). The electronic device 110 includes at least a processor 112 for executing software, and a memory module 114. The particular details of neither the processor 112 nor the memory module 114 are especially limiting, and will not be described further herein.

The system 100 includes a communication network 120. In some non-limiting embodiments of the present technology, the communication network 120 can be implemented as the Internet. In other embodiments of the present technology, the communication network 120 can be implemented differently, such as any wide-area communication network, local-area communication network, a private communication network and the like. The electronic device 110 is coupled to the communication network 120 via a communication link How the communication link is implemented is not particularly limited and will depend on how the electronic device 110 is implemented.

The system 100 also includes a server 130 connected to the network 120. The server 130 can be implemented as a conventional computer server. The server 130 can be implemented in any other suitable hardware and/or software and/or firmware or a combination thereof. In the depicted non-limiting embodiment of present technology, the server 130 is a single server. In alternative non-limiting embodiments of the present technology, the functionality of the server 130 may be distributed and implemented via multiple servers. The server 130 is coupled to the communication network 120 via a communication link (not separately numbered). How the communication link is implemented is not particularly limited and will depend on how the server 130 is implemented.

The server 130 is operatively coupled to a memory module 134. Memory module 134 may encompass one or more storage media and generally provide a place to store computer code (e.g., software and/or firmware). The memory module 134 can be implemented in various ways, including but not limited to: tangible computer-readable storage media including Read-Only Memory (ROM) and/or Random-Access Memory (RAM), one or more fixed storage devices such as hard disk drives (HDDs), solid-state drives (SSDs), flash-memory cards (e.g., Secured Digital or SD cards, embedded MultiMediaCard or eMMD cards). In some implementations, the memory module 134 could be replaced by a stand alone database operatively connected to the server 130, via the network 120 or directly connected to the server 130.

The memory module 134 stores inter alia a series of computer-readable instructions, which instructions when executed cause the processor 132 of the server 130 to execute the various operations and methods described herein.

In some non-limiting embodiments of the present technology, the system 100 includes a database 150 for data storage external to the user device 110 and the server 130 (but operatively connected thereto). In some implementations, the database 150 could be implemented as a cloud storage service. In other implementations, the database 150 could be one or more memory modules of a server or other computer-implemented system.

Both the user device 110 and the server 130 are operatively connected to a rights blockchain 140 via the network 120. While the blockchain 140 is identified as a part of the physical system 100, it should be noted that the blockchain 140 is in fact a large dataset acting as an open ledger for recording transactions, supported in servers and databases in a decentralized fashion. The server 130 is connected, via the network 120, to the blockchain 140 through any one of many computer devices accessing or supporting the blockchain 140.

Blockchain technology is most commonly known as the technology behind the popular cryptocurrency, Bitcoin. A blockchain creates a history of data deposits, messages, or transactions in a series of blocks where each block contains a hash (a mathematical summary) of the previous block. This creates a chain where any changes made to a block will change that block's hash, which must be recomputed and stored in the next block. This changes the hash of the next block, which must also be recomputed and so on until the end of the chain. Generally, this discourages changes to blocks due to the increasing difficulty created when the chain of blocks begins to have a significant length. Thus the blockchain is inherently resistant to modification of the data stored in the blocks.

The security of a blockchain is further increased by implementing it on a distributed network. This means a large number of users all have access to the blockchain and are all attempting to add blocks to the end of the chain. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires a consensus of the network majority.

Blockchains on a distributed network with sufficiently restrictive rules for creating valid blocks are fairly secure against unauthorized changes to the data stored in them. This makes blockchains particularly useful for recording transactions. In the present technology, the inventors have determined that such secure recording of transactions can help address the issues discussed above with respect to distributing media that is protected by copyright (for example), without resorting to some of the prior art Digital Rights Management (DRM) technologies with the inconveniences described above.

The blockchain 140 is illustrated as a separate entity from the server 130, but it is contemplated that the server 130 may host a portion of the blockchain 140 in some implementations. The blockchain 140 used in the present technology can be either a public or private blockchain. The blockchain 140 can also be implemented as a blockchain maintained solely for the purposes of the present technology, as a private or public blockchain, or can be integrated into an existing blockchain entity, including but not limited to: Ethereum, Bitnation, and any other blockchain developed using blockchain platform development such as Hyperledger, Nuco, etc.

Given the architecture described above, as well as using the various examples provided above, it is possible to execute a method of providing limited distribution of digital media files, as well as methods of exchanging and accessing copies of digital media files.

Specifically, the methods described herein provide a way to distribute digital works, generally subject to copyright, in a way that allows approved users to access the digital work, while aiding in prevention of prohibited copying or distribution.

Figure 2:
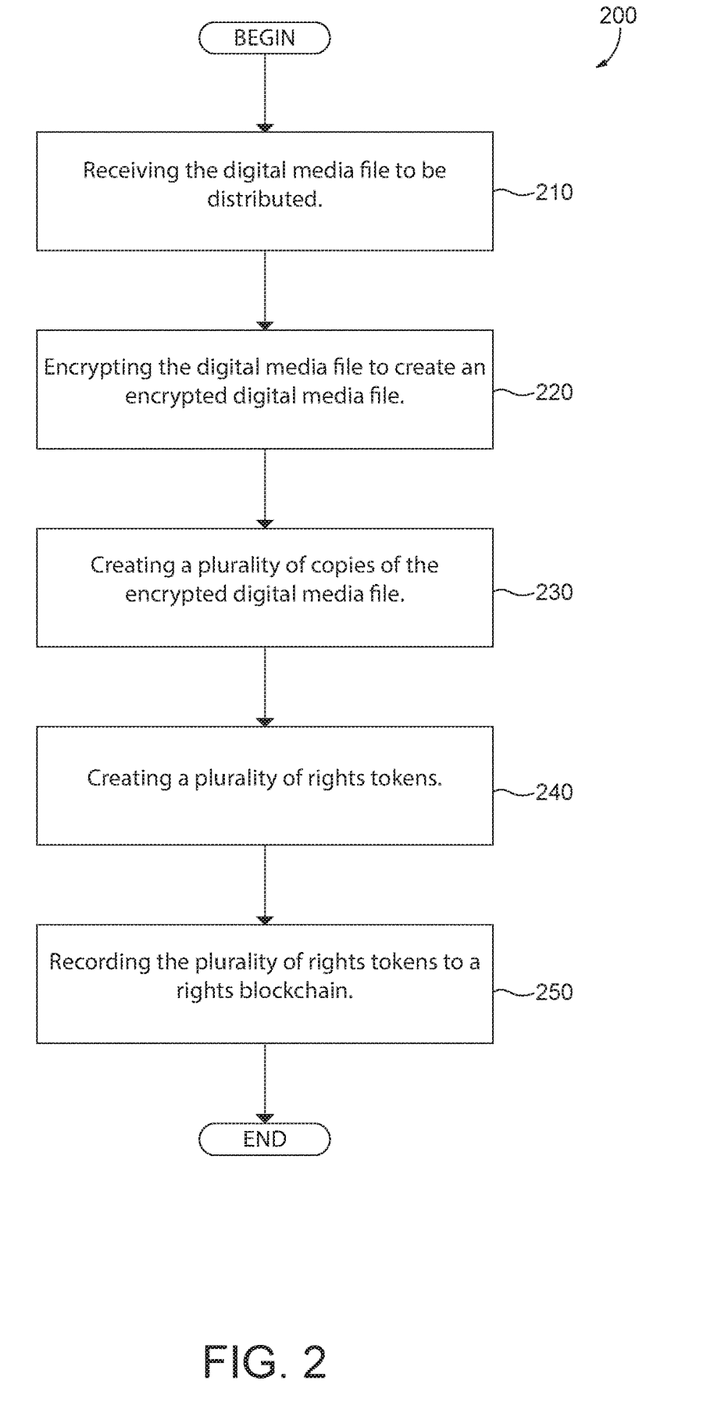
FIG. 2 is a flowchart schematically illustrating a method according to the present technology.
Figure 3:
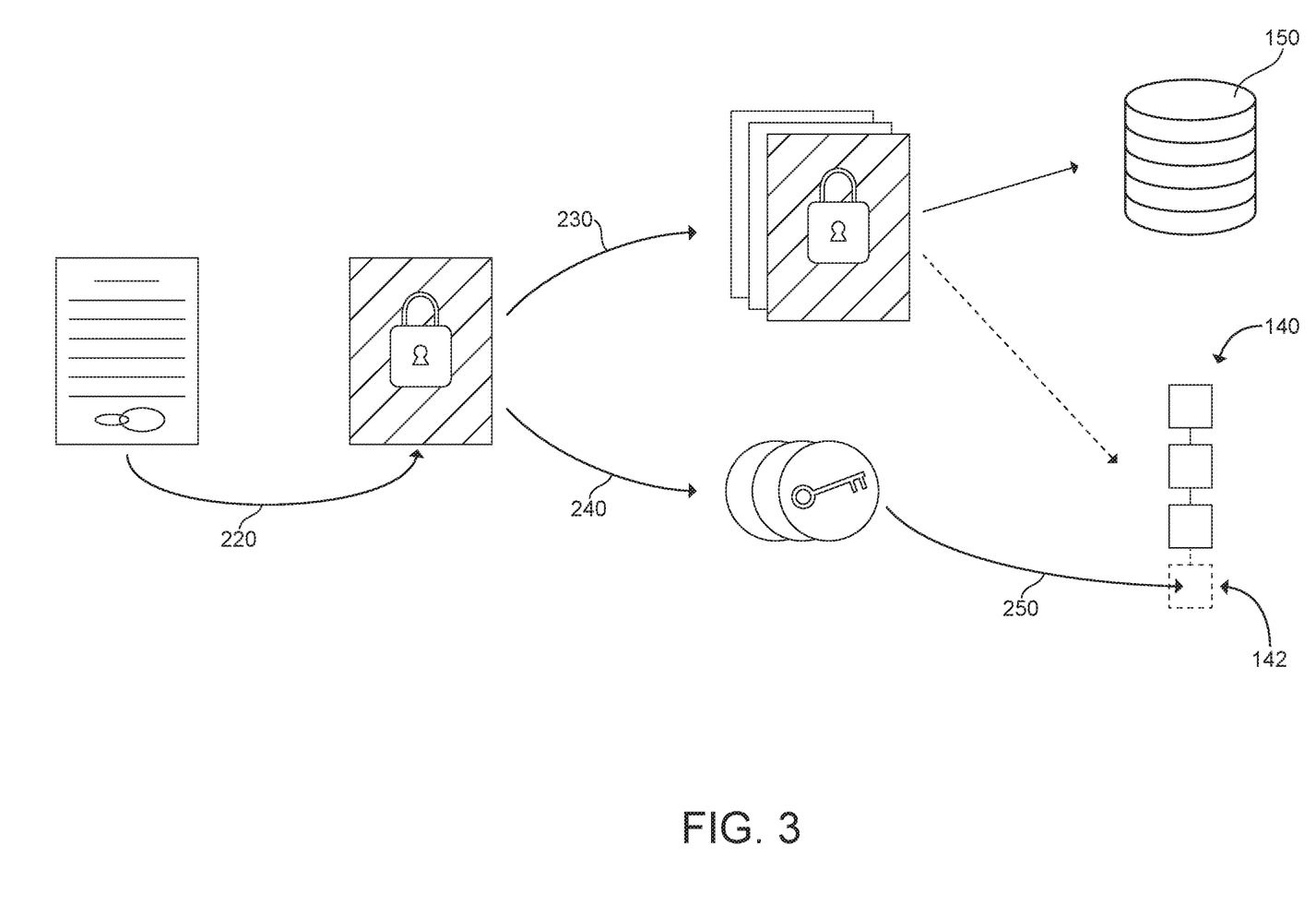
FIG. 3 is a schematic illustration of portions of the method of FIG. 2.

With reference to FIGS. 2 and 3, there is depicted a method 200 implemented in accordance with non-limiting embodiments of the present technology. The method 200 is executed by the processor 132 of the server 130. To that end, the memory module 134 stores computer executable instructions, the instructions when executed cause the processor 132 to execute the method 200.

Step 210—Receiving, by the Server from an Originator, the Digital Media File to be Distributed The method 200 starts at step 210, where the server 130 receives a digital media file from an originator using the user device 110. Generally, the server 130 hosts a user interface, for example a web portal or platform, which the originator accesses using a web browser run on the user device 110. In some implementations, the server 130 could receive the digital media file via a file transfer protocol (FTP). In other implementations, the server 130 could receive the digital media file from the database 150, the originator having uploaded the digital media document to the database 150 from the user device 100. It is also contemplated that the server 130 could receive the digital media file through an application, residing on the user device 110 or an other electronic device (computer, a mobile device, etc.) developed to create digital documents, the application including a functionality to connect with the server 130 in order to exchange the digital media file through an application programming interface (API).

The digital media file described herein generally applies to a digital literary document or work, such as an eBook in ePub3 format, but need not be so limited. The present technology can be applied to eBooks of different formats including but not limited to: any ePub format, Microsoft Word, Adobe PDF, Amazon digital file, Apple iBooks, and Open XML.

The digital media file could also be one or any number of different artistic works in electronic form. These works could include but are not limited to: audio books, digital music files, digital sound recordings in general, software and software code, poems, theses, other literary works, motion pictures, digitized visual arts such as paintings or drawings, digital photographs, industrial designs, and graphic designs.

The originator of the digital media file will generally be assumed to be an author of the work of the digital media file herein, but this is not necessarily the case. In some implementations, the originator could be the copyright owner, copyright assignee, or the exclusive licensee, for example. In the case of an eBook, for example, it is contemplated that the originator could be a publishing company that wishes to distribute electronic copies of an eBook containing a work of literature to which the publishing company owns the copyright. It is also contemplated, for example, that the originator could be a library which has procured the rights to lend copies of a particular eBook to its library members.

In some embodiments of the method 200, the server 130 could query the user device 110 as to whether the digital media file should be stored on the server 130 (in the memory module 134) and/or in the external database 150 upon receipt of the digital media file. If the originator sends, via the user device 110, a confirmation that the digital media file should be stored by the server 130, the server 130 could then save the digital media file to the memory module 134. In some implementations, the server 130 could store the digital media file in the database 150. It is also contemplated that in some embodiments of the method 200, the server 130 could query the user device 110 as to whether the digital media file should be stored or recorded to the blockchain 140. The digital media file could be recorded to a single block of the blockchain 140. In some cases, the digital media file could be partitioned into subpackets of data and recorded to different blocks on the blockchain 140. The method 200 would then further include creating an assembly key for reassembling the subpackets into the complete digital media file.

The method 200 then proceeds to executing step 220.

Step 220—Encrypting, by the Server, the Digital Media File to Create an Encrypted Digital Media File The method 200 then continues to step 220, where the server 130 encrypts the digital media file to create an encrypted version of the digital media file. The encryption can be carried out in a variety of methods, including but not limited to: AES, Triple DES, RSA, Blowfish, and Twofish.

As mentioned above, in some implementations the digital media file could be partitioned into subpackets and recorded to the blockchain 140. It is contemplated that each of the subpackets of the digital media file could also be separately encrypted and then recorded to the blockchain 140. In such a case, each encrypted subpacket would have corresponding public and private keys, in addition to the assembly key for reassembling the digital media file. As will be described in more detail below, the public key for each one of the subpackets could be separately recorded to the blockchain 140.

It is contemplated that the encryption of the digital media file could include separately encrypting portions of the digital media file. For example, in implementations where the digital media file is an eBook, each chapter could be separately encrypted, allowing for the originator to provide access rights to only some of the portions of the digital media file. In another non-limiting example, the digital media file could be a music album, and the encryption could be carried out separately for each song of that album.

The method 200 then proceeds to executing step 230.

Step 230—Creating, by the Server, a Plurality of Copies of the Encrypted Digital Media File At step 230, the server 130 creates multiple copies of the encrypted digital media file. The number of copies made in the method 200 corresponds to the number of copies that the originator desires to allow to circulate, as will be described in more detail below. In some implementations, the copies could be made by the user device 110, and then encrypted.

The method 200 then proceeds to executing step 240.

Step 240—Creating, by the Server, a Plurality of Rights Tokens, a Quantity of the Plurality of Rights Tokens being Equal to a Quantity of the Plurality of Copies of the Encrypted Digital Media File At step 240, the method 200 continues when the server 130 creates a plurality of rights tokens. The term "token" should be understood, in the context of the present technology, simply as a representation of a set of data linked to the right to access a given copy of the digital media file. The term "token" is used to reflect the exchangeable but unitary nature of the present technology to cryptocurrency, but it should be noted that the present technology is not cryptocurrency nor does it necessarily utilize the same methods, code and/or technology.

One rights token is created for each one of the encrypted copies of the digital media file, and the total quantity of rights tokens matches the number of encrypted copies. Each token contains a key for decrypting a corresponding one of the encrypted copies, and identifying information related to access rights for the encrypted copy.

Specifically, each token contains ownership information (who ever is allowed to decrypt the encrypted copy), and the key, password, or code necessary to decrypt it. It should be noted that the "ownership" recorded in the rights tokens are not limited to full, legal ownership, but may instead represent temporary access. For example, in the case where the rights tokens are used to manage lending in an electronic library system, the "ownership" detailed in the rights tokens could represent the user who has "checked out" the file and who has temporary access rights.

In some implementations of the present technology, the server 130 could query the user device 110 to determine a desired number of copies of the digital media file to allow for distribution, and the number of rights tokens and encrypted copies created then corresponds to that desired number of copies. It is also contemplated that the server 130 could query the user device 110 at earlier steps in the method 200.

The key described herein is not meant to be limiting. Generally, the key of the rights token is a public key which has a corresponding private key embedded in the encrypted document. The encrypted copy can then be decrypted when the correct public key is extracted from the rights token. Generally, is in many implementations of a blockchain, the key received from the blockchain 140 (when attempting to decrypt the encrypted copy) is a hashed version of the Public key. The private key, incorporated with or encapsulated in the encrypted copy, is used to derived the public key from the hashed version.

In some implementations of the present technology, the method 200 could further include encapsulating a smart contract into the encrypted copies and/or the rights tokens. The smart contract for each digital media file includes code for managing its digital rights. The different controls that could be included in the smart contract for a given digital media file, or for a portion of the encrypted copies of a given digital media file, include (but are not limited to): expiry dates, limits on reselling, and limits on loaning or gifting. This will be described in more detail below.

The smart contracts are written in a JavaScript-style language called Solidity, but this is not meant to be limited. It is contemplated that different languages could be employed, including but not limited to: Java, Python, CSS, PHP, Ruby, C++, C, Shell, C #, Objective C, VmL, Go, and Perl.

In some implementations of the method 200, the server 130 further receives, from the originator, information related to the desired controls to be placed on the plurality of encrypted copies to be embodied by the smart contract. In such implementations, the server 130 could receive the control information with the initial submission of the digital media file in step 210. In other such implementations, the method 200 could also include querying the user device 110 about desired controls, and the originator, via the user device 110, could provide the control information in response to the query. As mentioned above, the control information (received or requested from the user device 110) could any number of variables related to access and use of one or more of the copies of the digital media file. The method 200 would then further include creating the smart contract for managing distribution of the plurality of copies of the digital media file based on and including the control information.

The method 200 would then continue with encapsulating the smart contract each one of the rights tokens. Encapsulating the smart contract into the rights tokens is generally performed using database commands. The specific commands generally could vary, depending on, for example, the database type the blockchain is using for a specific implementation. It is contemplated that the smart contract could be encapsulated with its corresponding encrypted copy in some non-limiting implementations.

While referred to as the "smart contract" herein, it is contemplated that in some implementations the "smart contract" may not be active code stored to the blockchain 140 (such as in the style of Blockchain 2.0). Rather, it should be understood that the smart contract could, in some implementations, be limitations or conditions encoded into the rights token and/or encrypted document, without being an active, code-based smart contract in the blockchain 140.

For aid in understanding some aspects of the smart contracts, one non-limiting example of an implementation is as follows. The smart contract could indicate an end date for the access rights for the digital media file. The method 200 would then further include receiving a request to access a given copy of the digital media file from an electronic device of an end consumer, determining that the request was sent after the end date recorded in the smart contract; and sending an indication to the end user device that the given copy of the digital media file cannot be accessed.

The method 200 then proceeds to step 250.

Step 250—Recording, by the Server Via the Network, the Plurality of Rights Tokens to a Rights Blockchain Representative of Actions Related to Distribution of the Plurality of Copies of the Encrypted the Digital Media File At step 250, the server 130 records, via the network 120, the rights tokens to the rights blockchain 140. As mentioned above, the blockchain 140 is an open (but encrypted) distributed ledger representative of actions related to distribution of the plurality of copies of the encrypted the digital media file, wherein the ownership of access rights for a particular digital work (and transactions related thereto) can be recorded and verified.

The rights tokens are recorded to one or more new blocks 142 of the blockchain 140, (see FIG. 3). As the rights tokens also include the key necessary to decrypt the encrypted files, the blockchain 140 also serves as a storage and access point for the decryption data. As such, utilizing the blockchain 140 allows both verification of the ownership or access rights and accessing the decryption key to be done in a compact manner. Further, by connecting the decryption information with the confirmation of ownership/access rights, the process of transferring the rights and the decryption key is also facilitated.

When the rights tokens are first created and recorded to the blockchain 140, the ownership for each encrypted copy is assigned to the originator (as the originator is still the copyright holder at this time). Generally, the originator also receives the encrypted copies, or indications of the stored encrypted copies when the method 200 has completed.

In some implementations, the originator may also request that at least one encrypted copy to be stored directly to the rights blockchain 140. The method 200 could include, in some cases, recording one or more encrypted copy to a block of the blockchain 140.

In some implementations, the server 130 could determine that a file size of the encrypted copy exceeds a storage capacity of a block of the rights blockchain 140 and that the encrypted copy needs to be partitioned into multiple files in order to be recorded to the blockchain 140.

The method 200 could then include subdividing the digital media file into a plurality of subpackets of information and encrypting each of subpackets of information. In some cases, the encryption could be carried out using the same methods as encrypting the full digital media file, or a different method could be used depending on the specific implementation or file. In such a case, each one of the subpackets would have a corresponding rights token (including its public key).

The method 200 would then include the server 130 creating an assembly key for reassembling the subpackets of information into a full document. The method 200 would then continue with recording the subpackets of information to the rights blockchain 140 over multiple blocks of the rights blockchain 140. In such an implementation, the assembly key would be incorporated into the corresponding rights token for that encrypted copy.

As is mentioned above, in some implementations the digital media file itself could be first partitioned into subpackets, each subpacket then being encrypted and recorded to the blockchain 140. In such an implementation, the public key for each one of the subpackets would be separately recorded to the blockchain 140 in its own rights token. The rights tokens corresponding to all of the subpackets would be linked, and ownership of all such rights tokens would be recorded for the originator. As such, the owner of the digital media file would have secure access to the stored digital media file via the blockchain 140 (in addition to the encrypted copies created for distribution by the method 200).

As is described above, the number of rights tokens created is equal to the limited number of encrypted copies the originator desired to have to securely distribute. By recording the rights tokens to the blockchain 140, the tokens may be exchanged (bought and sold) but they cannot be added (without recommencing the method 200). Further, if unauthorized copies are made of the encrypted copies, no corresponding token will exist in the blockchain 140, and the unauthorized copy will not be usable. As such, the originator is provided with a limited number of copies for distribution of the digital media file. If the originator decides to create more encrypted copies to increase distribution, similar to a second printing for physical book distribution, the method 200 can be recommenced and performed in addition iterations.

Further, as the rights token identifies the party that has access rights and is kept separate from the encrypted copy, the encrypted copy is fairly portable for the legitimate user of the copy. For example, the user can move the encrypted copy from a computer to a smart phone, and still be able to open and decrypt the encrypted copy. According to the present technology, the user could access their copy of the digital media file on any device that has a web browser and an internet connection.

The method 200 can then terminate. Alternatively, the method 200 can further include additional steps such as those that follow.

As discussed above, the encrypted copies can be stored in or by various systems. In some implementations of the method 200, the server 130 could record the plurality of the encrypted copies to the rights blockchain 140. In some implementations, the method 200 further includes storing the encrypted copies to the memory 134 of the server 130. It is also contemplated that the method could further include storing, via the network 120, the encrypted copies to the external database 150 operatively connected to the network 120. In some such implementations, the method 200 could further include recording a link to the copies stored in the database 150 to the rights blockchain 140, either with or separate from the rights token.

As mentioned above, in some implementations, the method 200 could also include querying the originator as to a desired storage location for the encrypted copies, as well as a desired number of encrypted copies to be made.

In various implementations of the method 200, the server 130 could query the originator, via the user device 110, for various options related to the distribution or the desired controls (as discussed above).

In implementations of the method 200 where the smart contract has been created, some implementations of the smart contract could indicate an end date for access rights, as discussed above. It is contemplated that the originator could be queried by the server 130 as to a desired end date at various steps in the method 200. In some implementations, a start date or a limited period of use could be controlled or indicated in the smart contract.

In some implementations, the method 200 could also include querying the originator, via the user device 110, as to whether any end users are to be allowed any one of the encrypted copies to be shared on any one of various social media platforms. Upon receiving a positive confirmation from the user device 110 to allow the encrypted copies to be shared on one or more social media platforms, the method 200 could further include encoding at least one encrypted copy of the digital media file for sharing over one or more social networking platforms. It is contemplated that the permissions to share on a social media platform could be incorporated into the smart contract.

In some implementations, the method 200 could also include querying the originator, via the user device 110, whether to allow the encrypted copies to be rented, shared, or loaned. In such implementations, the method 200 could further include querying the originator about a desired price for loaning, a percentage of that price to be sent to the originator, to who the copy can be loaned, etc. It is also contemplated that the permissions for sharing or loaning could be incorporated into the smart contract.

In some implementations, the method 200 could also include querying the originator, via the user device 110, as to whether an end user should be allowed to give away or gift their encrypted copy. This querying could further include querying to whom the end user is allowed to gift their encrypted copy. It is also contemplated that the permissions for gifting an encrypted copy could be incorporated into the corresponding smart contract.

In some implementations, the method 200 could further include querying the user, via the user device 110, as to whether resale of a given encrypted copy is to be permitted. The querying could further include determining to whom it can be resold, at what cost, and what percentage of such a cost is to be redirected to the originator or a third party, etc. It is also contemplated that the resale permissions and conditions could be incorporated into the smart contract.

With the method 200 being completed as above, the originator has now been provided with a limited set of encrypted copies of the digital media file to distribute, where the rights are managed by the rights tokens recorded to the rights blockchain 140. As mentioned above, the originator is generally recorded as the "owner" of each of the encrypted copies, and is now free to sell, rent, loan, share or gift each of the encrypted copies.

The method 200 can then, in some implementations, be continued or resumed for interactions with end users—specifically, consumers who have rented, bought, or otherwise acquired from the originator the access rights for a given encrypted copy of the digital media file. For instance, once the originator has sold access to one of the encrypted copies to an end consumer, the method 200 could continue as follows.

In order to distinguish from the user device 110 of the originator, the device 110 associated with a consumer shall be referred to hereafter as the reader device 110. It should be noted, however, that the digital media file is not limited to literary documents and may be sound files, video files, etc.

First the server 130 receives, from the reader 110, a request to access a given copy of the encrypted digital media file, the request including user identifying information related to the consumer utilizing the reader device 110. The request could be received in various ways. For example, upon opening the encrypted copy on the reader device 110, the reader device 110 could automatically send a request to the server 130 for the decryption key in order to display a decrypted version of the encrypted digital media file.

Then the server 130 verifies the access rights of the consumer by comparing the identifying information contained in a corresponding one of the plurality of rights tokens to the user identifying information. If the identifying information matches, the server 130 provides the reader device 110 with the key from the rights tokens for decrypting the encrypted copy of the digital media file on the reader device 110.

It is contemplated that the steps described above, such as sending the identifying information and receiving the key could take place automatically, or nearly. For instance, in some implementations, the application for reading an eBook could prompt the reader to enter information, such as a password, in order to confirm identity information and the run the verification and decrypting in the background.

It is contemplated that the method 200 could include additional or different steps, either to perform additional functions and/or to perform the steps described above.

Additionally, certain steps could be performed in an assortment of different sequences, depending on for example user preferences, and is not limited to the order set forth in the explanation above.

Figure 4:
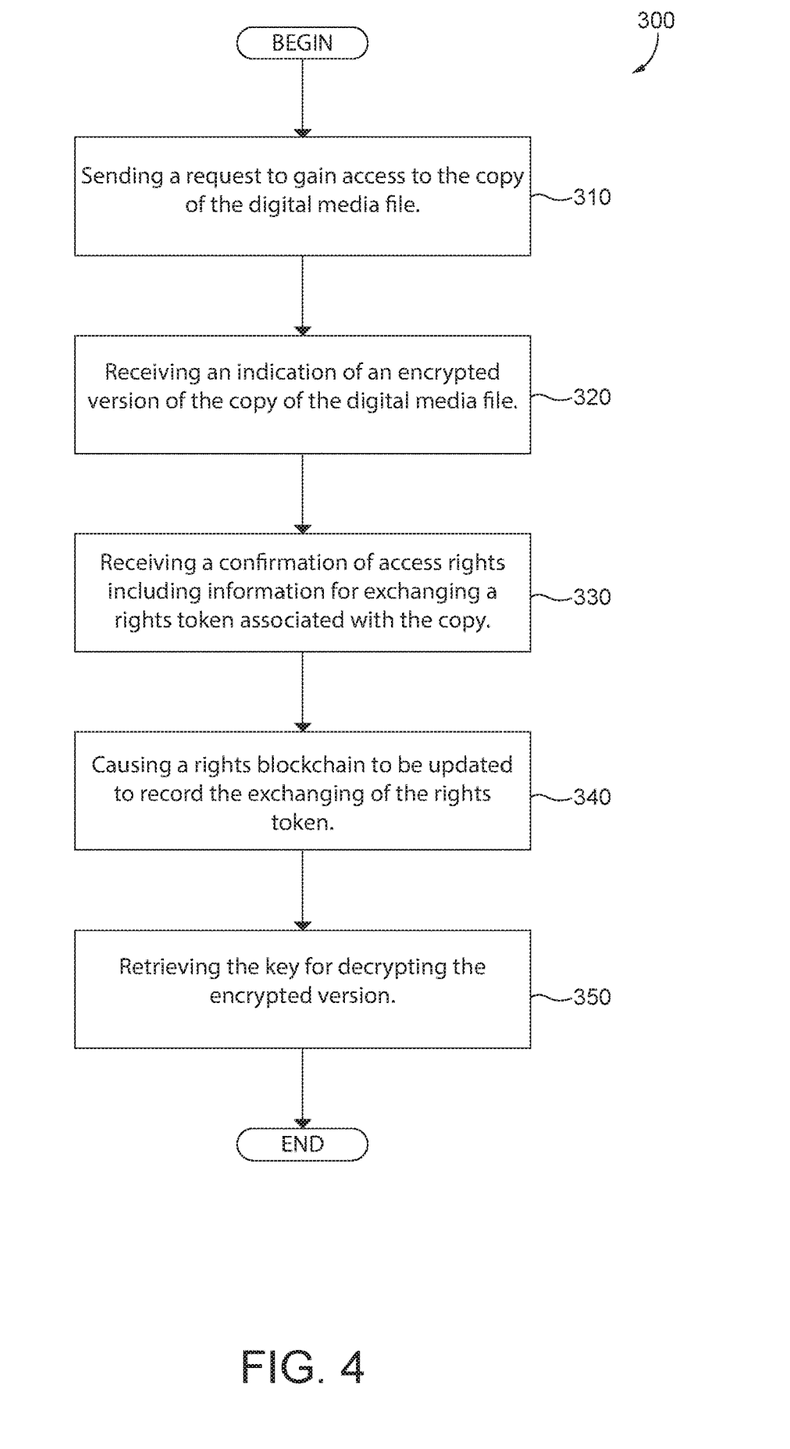
FIG. 4 is a flowchart schematically illustrating another method according to the present technology.

With reference to FIG. 4, there is depicted a flow chart of a method 300, the method 300 being implemented in accordance with additional non-limiting embodiments of the present technology. The method 300 is executed by the user device 110, where the processor 112 executes the method 300. In some implementations, the instructions for method 300 could be saved to the memory module 114 of the user device 110. It is also contemplated that the instructions for the method 300 could be provided to the user device 110 via the network 120.

It should be noted that while the method 300 is executed by the electronic device 110, being a computer, tablet, smartphone, etc., as described above with respect to the system 100, the user operating the user device 110 is distinct from the user discussed in regards to the method 200. The operator of the user device 110 of the method 300 is an end user or consumer of at least one copy of the digital media file, for example a reader of an eBook, encrypted copies of the eBook having been created and distributed using the method 200 above. As such, the user device 110 of the method 300 will be referred to as a "reader device" 110, to distinguish from the above.

Step 310—Sending a Request, by the User Device to a Server Via the Network, to Gain Access to the Copy of the Digital Media File The method 300 begins with step 310, when the reader device 110 sends a request to gain access to the copy of the digital media file to a server, either the server 130 or some other server operatively connected to the blockchain 140, via the network 120.

In some implementations, the request from the reader device 110 includes either a payment or payment information in order to purchase the access rights for the encrypted copy of the digital media file. In some other implementations, the request could include subscription information for an electronic library system. In some implementations, the request can be sent from the reader device 110 via an online platform or portal.

The method 300 then proceeds to step 320.

Step 320—Receiving, from the Server, an Indication of an Encrypted Version of the Copy of the Digital Media File The method 300 continues with step 320, where the reader device 110 receives an indication of an encrypted version of the copy of the digital media file from the server of step 310. The indication is any one of: a website address for accessing the encrypted version of the copy via the network 120, a website address for downloading the encrypted version of the copy to the reader device 110, and the encrypted version of the copy to be stored to the reader device 110.

The method 300 then proceeds to step 330

Step 330—Receiving, from the Server, a Confirmation of Access Rights Including Information for Exchanging a Rights Token Associated with the Copy, the Rights Token Including at Least a Key for Decrypting the Encrypted Version The method 300 continues with step 330, with the reader device 110 receiving, from the server, a confirmation of access rights. This confirmation generally includes information for exchanging the rights token associated with the copy. In some implementations, this information and/or confirmation includes the proof of payment from the step 310. In implementations where the request of step 310 includes, for instance, subscription information for an eBook library, the information could include a confirmation of access rights based on the subscription.

The method 300 then proceeds to step 340

Step 340—Causing, by an Application of the User Device, a Rights Blockchain to be Updated to Record the Exchanging of the Rights Token The method 300 continues with step 340, causing, by an application of the reader device 110, the rights blockchain 140 to be updated to record the exchanging of the rights token. By recording the exchange of the rights token to the rights blockchain 140, the ownership or access rights are transferred. By the present technology, access is controlled by confirming ownership through the blockchain 140 (and retrieving the decryption key therefrom once confirmed). Thus, the new owner or borrower can subsequently access/open/decrypt their purchased or borrowed copy of the digital media file thereafter.

As with most blockchain technology, exchanging the rights token includes recording that the rights token has been withdrawn from the previous owner, and recording rights token as having been given to the new owner, thereby adding new ownership information to the rights token's transaction history in the blockchain 140.

The method 300 then proceeds to step 350

Step 350—Retrieving, from the Blockchain Over the Network, the Key for Decrypting the Encrypted Version The method 300 continues with step 340, where the reader device 110 retrieves the decryption key for decrypting the encrypted version from the blockchain 140 over the network 120, now that the rights token has transferred ownership. As is mentioned above, the decryption key encapsulated in the rights token may not be simply a decryption key, but may be part of a public/private key pair, or may be a code or password, for example, for decrypting the encrypted version.

The method 300 can then terminate.

It is contemplated that the method 300 could include additional or different steps, either to perform additional functions and/or to perform the steps described above. Additionally, certain steps could be performed in an assortment of different sequences, depending on for example user preferences, and is not limited to the order set forth in the explanation above.

Figure 5:
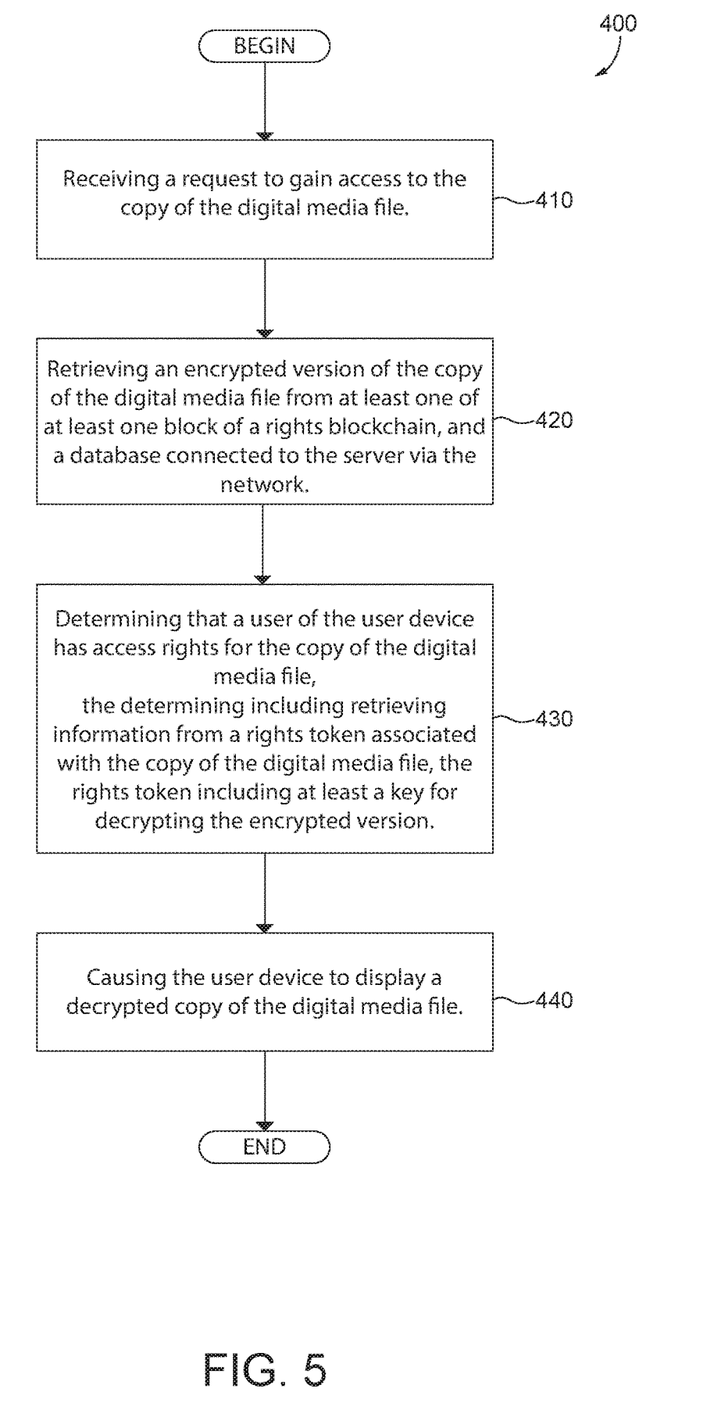
FIG. 5 is a flowchart schematically illustrating yet another method according to the present technology.

With reference to FIG. 5, there is depicted a flow chart of a method 400 implemented in accordance with non-limiting embodiments of the present technology. The method 400 is executed by the server 130, where the processor 132 executes the method 400 and the instructions for method 400 are generally saved to the memory module 134.

As with the method 300, the user device 110 of the method 400 is the device 110 belonging or being used by the end consumer, and will therefore be referred to as the reader device 110, in the context of the method 400.

Step 410—Receiving a Request, by the Server from the User Device, to Gain Access to the Copy of the Digital Media File The method 400 starts at step 410, where the server 130 receives a request from the reader device 110 to gain access to an encrypted copy of the digital media file. Generally, the server 130 hosts a web application or portal which the reader accesses via a web browser application of the reader device 110. The request could include various types of information, including but not limited to: information identifying the digital media file to which the reader desires to gain access, identifying information related to the reader and/or the reader device, and subscription information.

It some implementations, the reader could utilize an application for document reading resident on the reader device 110. In this case, the reader device 110 would act as the server 130 and the server 130 would therefore not required. In some situations, such as an eBook of format ePub 3, the code could be integrated into the digital document itself. In such cases, there would be no need to access the server 130 and nor to have a specific application residing on the reader device 110. The reader would simply open their browser to open the digital file and the code within the digital media file copy would perform the same tasks as if it were the server 130.

The method 400 then proceeds to step 420.

Step 420—Retrieving, by the Server, an Encrypted Version of the Copy of the Digital Media File from at Least One of at Least One Block of a Rights Blockchain, and a Database Connected to the Server Via the Network The method 400 continues at step 420, with the server 130 (or the user device 110) retrieving an encrypted copy of the digital media file. The encrypted copy is retrieved from either the database 150 (connected to the server 130 or the user device 110 via the network 120) or from one or more blocks of the rights blockchain 140. In some implementations, the server 130 could also recover the encrypted copy from the memory module 134 of the server 130. As described above, the encrypted copies of the digital media file may be recorded directly to the blockchain 140 (either in one block, or across different blocks depending on the file size). In some other cases, it may be preferable, either for the originator or for the final users, for one or more of the encrypted copies to be stored to the external database 150.

In some implementations, retrieving the encrypted file could include sending the encrypted copy of the digital media file to the reader device 110. It is also contemplated that the server 130 or the blockchain 140 could provide a link to the reader device 110 for the reader device 110 to retrieve the encrypted copy from the database 150, an other cloud or remote storage service, etc.

The method 400 then proceeds to step 430.

Step 430—Determining, by the Server, that a User of the User Device has Access Rights for the Copy of the Digital Media File, the Determining Including Retrieving Information from a Rights Token Associated with the Copy of the Digital Media File, the Rights Token Including at Least a Key for Decrypting the Encrypted Version The method 400 continues at step 430, when the server 130 determines that the reader of the reader device 110 has access rights for the digital media file copy. The server 130 determines the access rights by querying and/or receiving confirmation from the blockchain 140. The server 130 or the user device 110 using an application will determined if the public key matches the private key and determines the access rights. If the access rights are not provided (the keys do not match), reader will not be able to access the document as it will remain encrypted. If the reader has access rights (the keys match), the document will be decrypted by the server 130 or the application on the user device 110. It is contemplated that the document could contain the code to manage some portion of the above.

Step 430 further includes retrieving information from the rights token associated with the copy of the digital media file. As is described in detail above, the rights token includes a key for decrypting the encrypted copy, which can only be extracted from the blockchain 140 when the server 130 determines that the ownership information of the rights token matches the user and/or user device 110 attempting to retrieve the key.

The method 400 then proceeds to step 440.

Step 440—Causing the User Device 110 to Display a Decrypted Copy of the Digital Media File The method 400 continues at step 440 with causing the reader device 110 to display a decrypted copy of the digital media file.

This can be done in various ways. The server 130 can send a decrypted version to the reader device 110, but generally the file would need to be provided in a way as to avoid copying or sharing of the decrypted version. More generally, the server 130 can provide the key to the reader device 110, as discussed above, such that the reader device 110 can decrypt and show the decrypted version. In some implementations, the key could only be active while the server 130 and the reader device 110 are actively connected. In some implementations, the reader device 110 could display a version of the decrypted document online, accessible to the reader device 110 through a browsing application for example, while not saving or sending the decrypted document itself (for example, similar to a streaming service).

The method 400 can then terminate.

It is contemplated that the method 400 could include additional or different steps, either to perform additional functions and/or to perform the steps described above. Additionally, certain steps could be performed in an assortment of different sequences, depending on for example user preferences, and is not limited to the order set forth in the explanation above.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

For some perspective of the present technology, some of the features of the present technology can be summarized as following, presented in numbered clauses.

CLAUSE 1: A computer-implemented method (200) of providing limited distribution of a digital media file, the method (200) being executable at a server (130) connected to a network (120), the server (130) comprising memory (134), the method (200) comprising: receiving (210), by the server (130) from an originator, the digital media file to be distributed; encrypting (220), by the server (130), the digital media file to create an encrypted digital media file; creating (230), by the server (130), a plurality of copies of the encrypted digital media file; creating (240), by the server (130), a plurality of rights tokens, a quantity of the plurality of rights tokens being equal to a quantity of the plurality of copies of the encrypted digital media file, each one of the rights tokens containing at least: a key for decrypting a corresponding one of the plurality of copies of the encrypted digital media file, and identifying information related to access rights for the digital media file; and recording (250), by the server (130) via the network (120), the plurality of rights tokens to a rights blockchain (140), the rights blockchain (140) being representative of actions related to distribution of the plurality of copies of the encrypted the digital media file.

CLAUSE 2: The computer-implemented method (200) of clause 1, further comprising: receiving, by the server (130) from the originator, information related to desired controls to be placed on the plurality of copies of the digital media file; creating a smart contract for managing distribution of the plurality of copies of the digital media file, the smart contract including at least the information related to the desired controls; and wherein the smart contract is encapsulated into each one of the rights tokens.

CLAUSE 3: The computer-implemented method (200) of clause 2, wherein: the smart contract indicates an end date for the access rights for the digital media file; and the method (200) further comprises: receiving, from a user device (110), a request to access a given copy of the digital media file; determining that the request was sent after the end date recorded in the smart contract; and sending an indication to the user device (110) that the given copy of the digital media file cannot be accessed.

CLAUSE 4: The computer-implemented method (200) of clause 1, further comprising: receiving, from the originator, information related to a desired number of copies of the digital media file to allow for distribution; and wherein: the quantity of rights tokens created corresponds to the desired number of copies of the digital media file.

CLAUSE 5: The computer-implemented method (200) of clause 1, further comprising: receiving, by the server (130) from the originator, a request to store at least one copy of the plurality of copies of the encrypted digital media file in the rights blockchain (140); determining, by the server (130), that a file size of the at least one copy exceeds a storage capacity of a block of the rights blockchain (140); subdividing, by the server (130), the digital media file into a plurality of subpackets of information; encrypting, by the server (130), each one of the plurality of subpackets of information; creating, by the server (130), an assembly key for reassembling the plurality of subpackets of information; and recording, by the server (130) via the network (120), the plurality of subpackets of information to the rights blockchain (140), the plurality of subpackets of information being recording over a plurality of blocks of the rights blockchain (140); and wherein: a corresponding one of the plurality of rights tokens further includes the assembly key for the at least one copy.

CLAUSE 6: The method (200) of clause 1, further comprising recording the plurality of copies of the encrypted digital media file to the rights blockchain (140).

CLAUSE 7: The method (200) of clause 1, further comprising storing the plurality of copies of the encrypted digital media file to the memory (134) of the server (130).

CLAUSE 8: The method (200) of clause 1, further comprising storing, via the network (120), the plurality of copies of the encrypted digital media file to a database (150) external to the server (130), the database (150) being operatively connected to the network (120).

CLAUSE 9: The method (200) of clause 8, further comprising recording a link to at least one of the plurality of copies stored in the database (150) to at least one block of the rights blockchain (140).

CLAUSE 10: The method (200) of clause 1, further comprising: receiving, from a user device (110), a request to access a given copy of the encrypted digital media file, the request including user identifying information related to a user; verifying access rights of the user, by the server (130) via the network (120), by comparing the identifying information contained in a corresponding one of the plurality of rights tokens to the user identifying information; and when the identifying information of the corresponding one of the plurality of rights tokens matches the user identifying information, providing, to the user device (110), the key from the corresponding one of the plurality of rights tokens for decrypting the encrypted copy of the digital media file.

CLAUSE 11: The method (200) of clause 1, wherein: the digital media file is a digital literary document; and the originator is an owner of a copyright of the digital literary document.

CLAUSE 12: The method (200) of clause 1, further comprising encoding at least one of the plurality of copies of the encrypted digital media file for sharing over a social networking platform.

CLAUSE 13: A computer-implemented method (300) of gaining access to a copy of a digital media file, the copy being one of a limited number of copies, the method (300) being executable on a user device (110) connected to a network (120), the method (300) comprising: sending (310) a request, by the user device (110) to a server (130) via the network (120), to gain access to the copy of the digital media file; receiving (320), from the server (130), an indication of an encrypted version of the copy of the digital media file, the indication including at least one of: a website address for accessing the encrypted version of the copy via the network (120), a website address for downloading the encrypted version of the copy to the user device (110), and the encrypted version of the copy to be stored to the user device (110); receiving (330), from the server (130), a confirmation of access rights including information for exchanging a rights token associated with the copy, the rights token including at least a key for decrypting the encrypted version; causing (340), by an application of the user device (110), a rights blockchain (140) to be updated to record the exchanging of the rights token; and retrieving (350), from the blockchain (140) over the network (120), the key for decrypting the encrypted version.

CLAUSE 14: A computer-implemented method (400) of providing access to a copy of a digital media file, the copy being one of a limited number of copies, the method (400) being executable on a server (130) connected to a network (120), the server (130) being connected to a user device (110) via the network (120), the method (400) comprising: receiving (410) a request, by the server (130) from the user device (110), to gain access to the copy of the digital media file; retrieving (420), by the server (130), an encrypted version of the copy of the digital media file from at least one of: at least one block of a rights blockchain (140), and a database (150) connected to the server (130) via the network (120); determining (430), by the server (130), that a user of the user device (110) has access rights for the copy of the digital media file, the determining including retrieving information from a rights token associated with the copy of the digital media file, the rights token including at least a key for decrypting the encrypted version; and causing (440) the user device (110) to display a decrypted copy of the digital media file.

CLAUSE 15: A server (130) comprising: a network communication interface for two-way communication over a network (120); memory (134) for storing instructions; and a processor (132) operatively connected to the memory (134) and the network communication interface, the processor (132) being configured to execute the instructions to: receive (210), from an originator, the digital media file to be distributed; encrypt (220) the digital media file to create an encrypted digital media file; create (230) a plurality of copies of the encrypted digital media file; create (240) a plurality of rights tokens, a quantity of the plurality of rights tokens being equal to a quantity of the plurality of copies of the encrypted digital media file, each one of the rights tokens containing at least: a key for decrypting a corresponding one of the plurality of copies of the encrypted digital media file, and identifying information related to access rights for the digital media file; and record (250), via the network (120), the plurality of rights tokens to a rights blockchain (140), the rights blockchain (140) being representative of actions related to distribution of the plurality of copies of the encrypted the digital media file.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of limiting a distribution of a digital media file, the method being executable at a server connected to a network, the server comprising memory, the method comprising:

receiving, by the server from an originator, the digital media file to be distributed;

encrypting, by the server, the digital media file to create an encrypted digital media file;

creating, by the server, a limited number of copies of the encrypted digital media file;

creating, by the server, a plurality of rights tokens, a quantity of the plurality of rights tokens being equal to a quantity of the limited number of copies of the encrypted digital media file, each one of the rights tokens containing at least:

a key for decrypting a corresponding one of the limited number of copies of the encrypted digital media file, and identifying information related to access rights for the digital media file;

recording, by the server via the network, the plurality of rights tokens to a rights blockchain, the rights blockchain being representative of actions related to distribution of the limited number of copies of the encrypted digital media file;

receiving, by the server from the originator, a request to store at least one copy of the limited number of copies of the encrypted digital media file in the rights blockchain;

determining, by the server, that a file size of the at least one copy exceeds a storage capacity of a block of the rights blockchain;

subdividing, by the server, the digital media file into a plurality of subpackets of information;

encrypting, by the server, each subpacket of the plurality of subpackets of information;

creating, by the server, an assembly key for reassembling the plurality of subpackets of information; and recording, by the server via the network, the plurality of subpackets of information to the rights blockchain, the plurality of subpackets of information being recorded over a plurality of blocks of the rights blockchain; and wherein a corresponding one of the plurality of rights tokens further includes the assembly key for the at least one copy.

2. The computer-implemented method of claim 1, further comprising:
receiving, by the server from the originator, information related to desired controls to be placed on at least one copy of the limited number of copies of the digital media file;
creating a smart contract for managing distribution of the at least one copy, the smart contract including at least the information related to the desired controls; and wherein:
the smart contract is encapsulated into at least one of the rights tokens.

3. The computer-implemented method of claim 2, wherein:
the smart contract indicates an end date for the access rights for the digital media file; and
the method further comprises:
receiving, from a user device, a request to access a given copy of the digital media file;
determining that the request was sent after the end date recorded in the smart contract; and
sending an indication to the user device that the given copy of the digital media file cannot be accessed.

4. The computer-implemented method of claim 1, further comprising:
receiving, from the originator, information related to a desired number of copies of the digital media file to allow for distribution; and wherein:
the quantity of rights tokens created corresponds to the desired number of copies of the digital media file.

5. The method of claim 1, further comprising recording the copies of the encrypted digital media file to the rights blockchain.

6. The method of claim 1, further comprising storing the copies of the encrypted digital media file to the memory of the server.

7. The method of claim 1, further comprising storing, via the network, the copies of the encrypted digital media file to a database external to the server, the database being operatively connected to the network.

8. The method of claim 7, further comprising recording a link to at least one of the copies stored in the database to at least one block of the rights blockchain.

9. The method of claim 1, wherein:
each one of the rights tokens further comprises ownership information for the access rights for a corresponding copy of the digital media file;
the rights blockchain prevents any addition to the quantity of the plurality of rights tokens until additional of copies of the encrypted digital media file are created by the server, so that no corresponding rights token is available for any unauthorized copy of the digital media file; and
the method further comprises updating, in the rights blockchain, the ownership information for the access rights for the copy of the digital media file when the access rights for the copy of the digital media file are transferred from one user to another user.

10. The method of claim 9, wherein the key for decrypting a corresponding one of the limited number of copies of the encrypted digital media file is not modified when the access rights for the copy of the digital media file are transferred from one user to another user.

11. The method of claim 1, wherein the key for decrypting a corresponding encrypted copy of the digital media file is only active while a user device is actively connected to the server.

12. The method of claim 1, further comprising encoding at least one of the limited number of copies of the encrypted digital media file for sharing over a social networking platform.

13. A server comprising:
a network communication interface for two-way communication over a network;
memory for storing instructions; and
a processor operatively connected to the memory and the network communication interface, the processor being configured to execute the instructions to:
receive, from an originator, a digital media file to be distributed;
encrypt the digital media file to create an encrypted digital media file;
create a limited number of copies of the encrypted digital media file;
create a plurality of rights tokens, a quantity of the plurality of rights tokens being equal to a quantity of the limited number of copies of the encrypted digital media file, each one of the rights tokens containing at least:
a key for decrypting a corresponding one of the limited number of copies of the encrypted digital media file, and
identifying information related to access rights for the digital media file;
record, via the network, the plurality of rights tokens to a rights blockchain, the rights blockchain being representative of actions related to distribution of the limited number of copies of the encrypted digital media file;
in response to receiving a request to store at least one copy of the limited number of copies of the encrypted digital media file in the rights blockchain:
determine that a file size of the at least one copy exceeds a storage capacity of a block of the rights blockchain;
subdivide the digital media file into a plurality of subpackets of information;
encrypt each subpacket of the plurality of subpackets of information;
create an assembly key for reassembling the plurality of subpackets of information; and
record the plurality of subpackets of information to the rights blockchain, the plurality of subpackets of information being recorded over a plurality of blocks of the rights blockchain,
a corresponding one of the plurality of rights tokens further including the assembly key for the at least one copy.

* * * * *